United States Patent [19]
Chester

[11] 4,210,313
[45] Jul. 1, 1980

[54] PRESSURE ACTUATED RESILIENT VALVE SEAL

[75] Inventor: Arnold M. Chester, West Hartford, Conn.

[73] Assignee: Litton Industrial Products, Inc., East Hartford, Conn.

[21] Appl. No.: 574,570

[22] Filed: May 5, 1975

Related U.S. Application Data

[63] Continuation-in-part of Ser. No. 385,571, Aug. 3, 1973, abandoned.

[51] Int. Cl.² ............................................. F16K 1/22
[52] U.S. Cl. .................................... 251/306; 251/173
[58] Field of Search ................ 251/172, 173, 306, 307

[56] References Cited

U.S. PATENT DOCUMENTS

| | | | |
|---|---|---|---|
| 3,076,631 | 2/1963 | Grove | 251/173 |
| 3,399,863 | 9/1968 | Fawkes | 251/306 |
| 3,608,861 | 9/1971 | Helman | 251/173 |
| 3,658,292 | 4/1972 | Takigawa | 251/306 |
| 3,734,457 | 5/1973 | Roos | 251/306 |

*Primary Examiner*—Harold W. Weakley
*Attorney, Agent, or Firm*—Spencer T. Smith

[57] ABSTRACT

A valve comprising a closure member including an annular peripheral sealing surface, a supporting shaft fixedly secured to opposing sides of the closure member, a housing including a cylindrical flow passage and means for rotatably supporting the closure member supporting shaft, means for rotating the closure member from a first position, whereat the flow passage is open, to a second position, whereat the flow passage is closed, an annular valve seat including an annular sealing surface, the housing further including an annular valve seat receiving channel selectively configured to support the annular valve seat for mating engagement with the closure member sealing surface when the closure member is at the closed position and the valve seat is at the neutral or zero pressure position, the valve seat including a recessed portion on one side thereof with a first annular groove extending axially into the valve seat from the recessed portion and a second annular groove extending axially into the other side of the valve seat, the second groove dividing the other valve seat side into upper and lower portions, the side of the receiving channel adjacent to the other side of the valve seat being spaced from the lowermost part of the upper portion and being selectively inclined relative thereto, when the valve seat is in the neutral position, to establish a spacing therebetween which linearly increases towards the uppermost part of the upper portion to permit selected rotation of the valve seat into engagement therewith, the annular closure member sealing surface extending incrementally radially outwardly from the one side to the other side of the valve seat.

4 Claims, 8 Drawing Figures

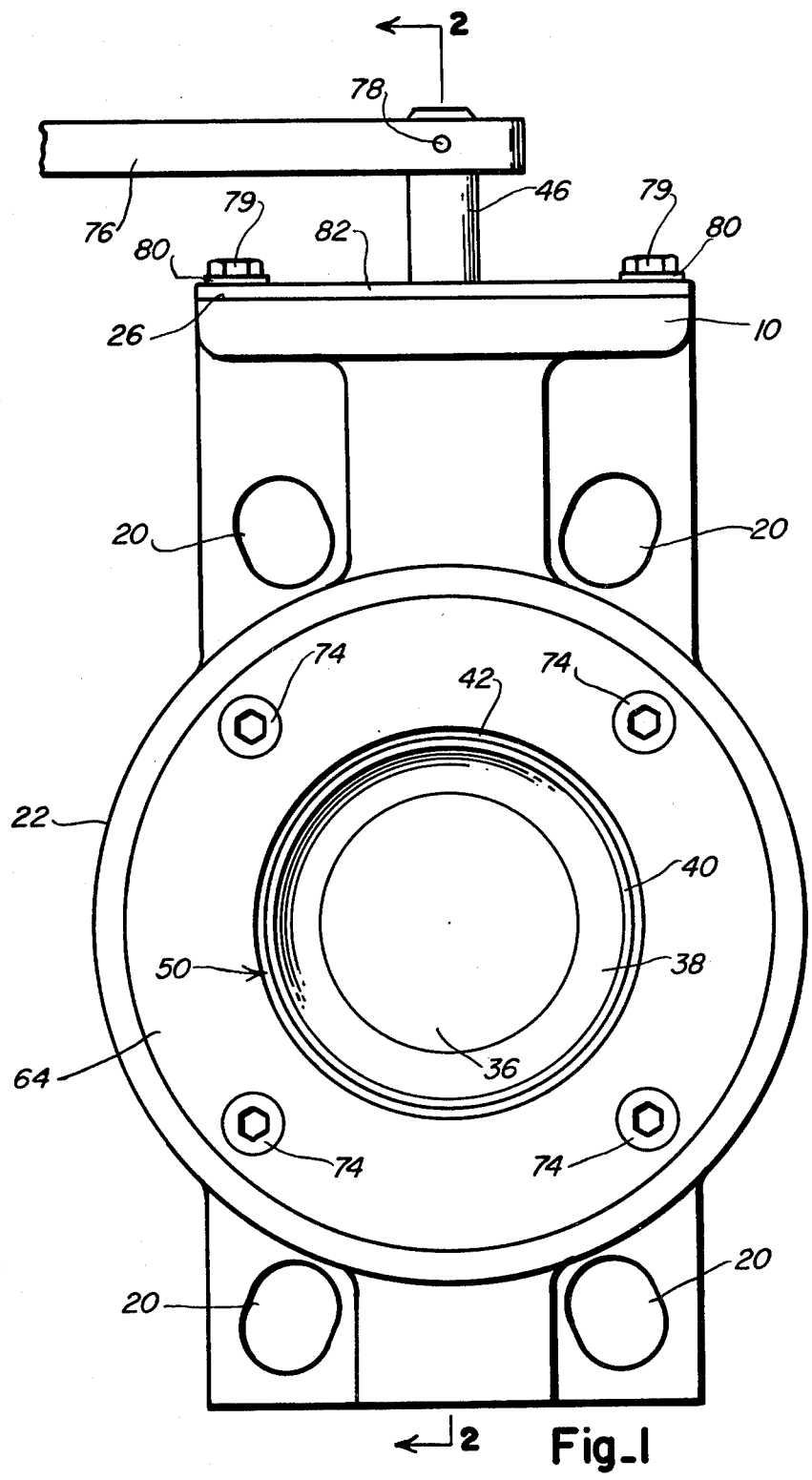
Fig_1

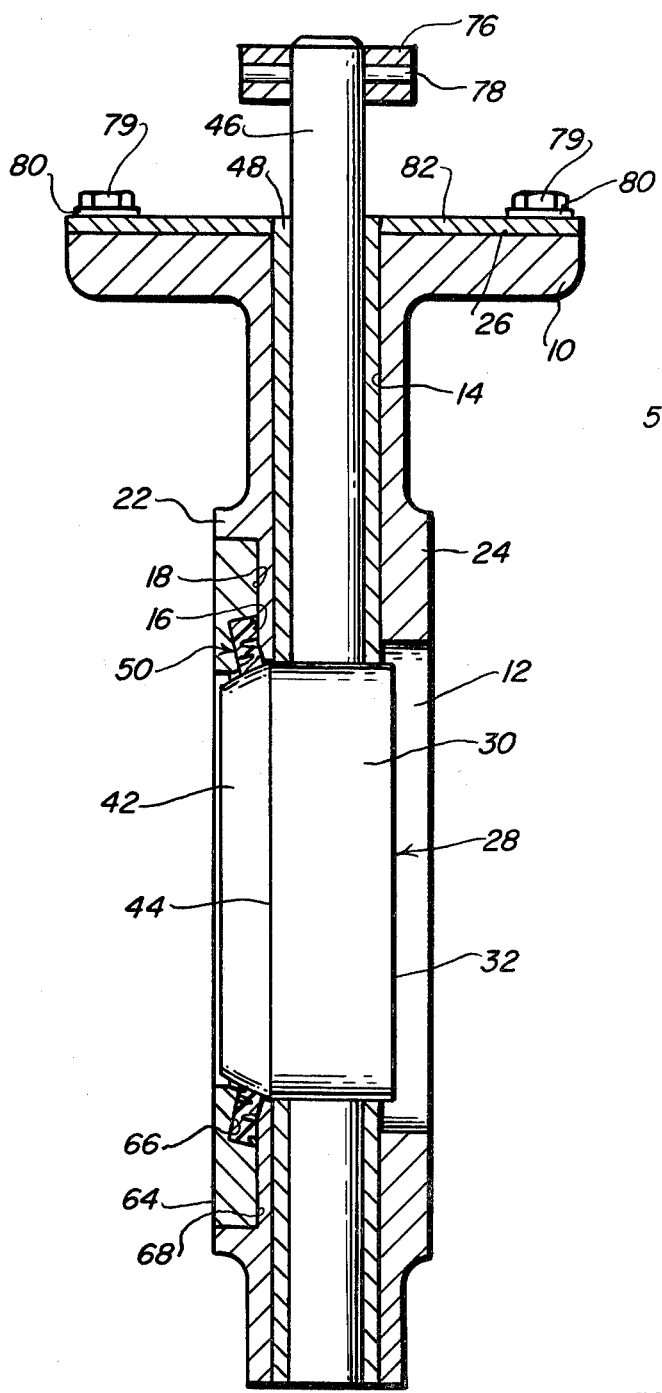
Fig_2
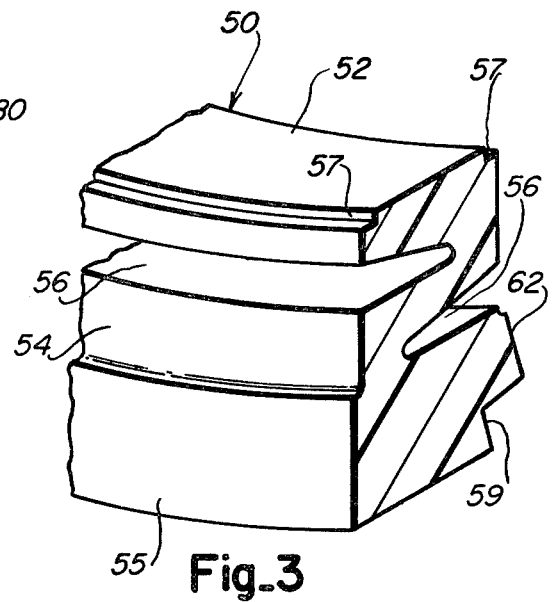
Fig_3
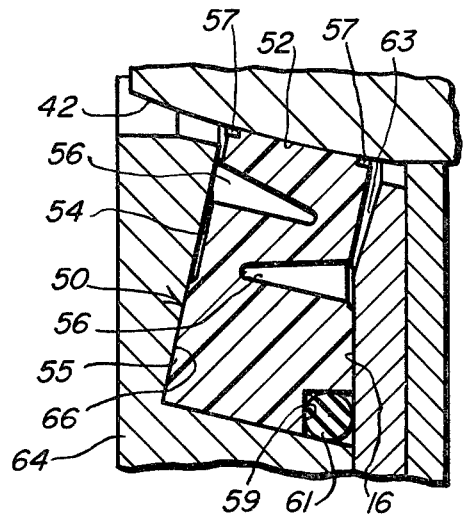
Fig_4
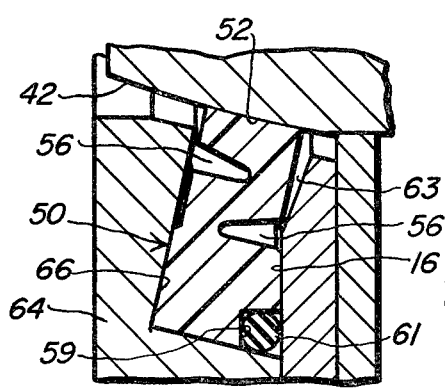
Fig_5

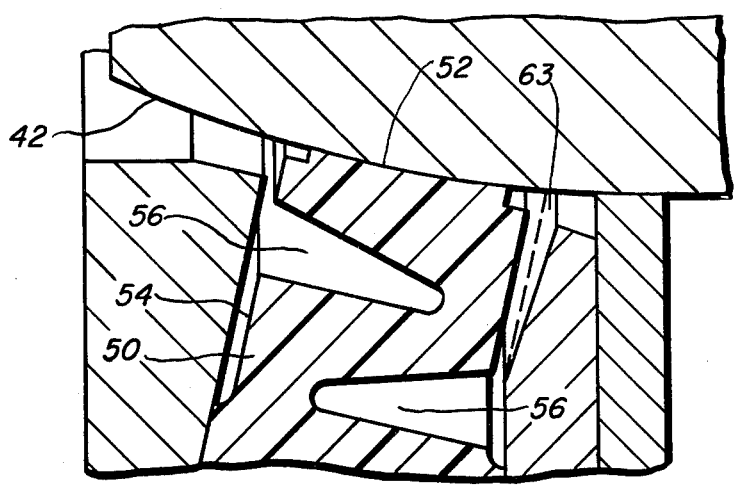
Fig_6
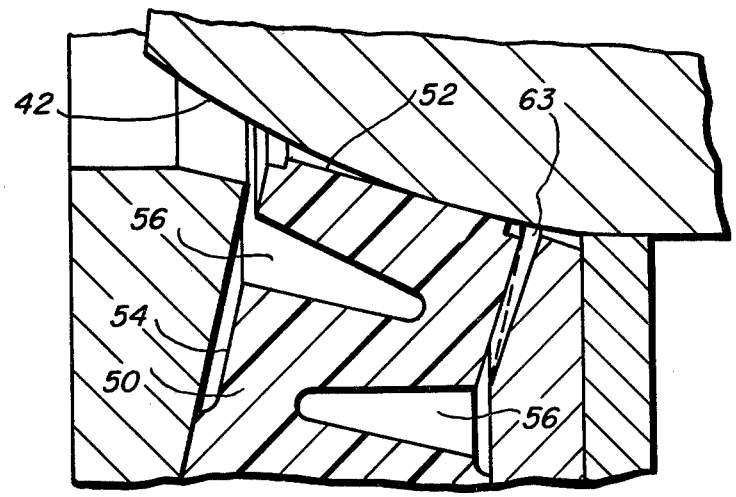
Fig_7
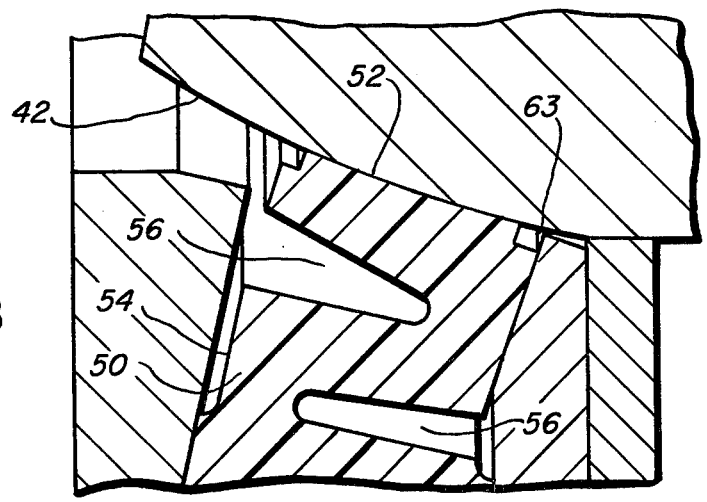
Fig_8

PRESSURE ACTUATED RESILIENT VALVE SEAL

The present application is a Continuation In Part of U.S. patent application Ser. No. 385,571, filed Aug. 3, 1973, now abandoned.

This invention relates to valves for controlling fluid flow and particularly to butterfly or ball valves having a pressure actuated seal disposed between the closure member and the flow passage.

The prior art includes various approaches for effecting a seal between a butterfly and a flow passage, none of which have been completely satisfactory. U.S. Pat. No. 3,642,248, for example, discloses the utilization of a selectively displaceable compound sealing ring to achieve the necessary sealing action. Another approach is disclosed in U.S. Pat. No. 3,409,269, Fawkes, wherein a seal, manufactured of a very resilient material, deflects to allow the passage of pressurized fluid into an internal cavity, whereby the fluid pressure will act to urge the seal towards the mating surface. Another approach is shown in U.S. Pat. No. 3,658,292, Takigawa, wherein a seal having a generally channel-shaped cross-section with radially spaced outer and inner flanges connected by an intermediate section is utilized. In both the Takigawa and Fawkes' structures the surface which is exposed to fluid pressure is not given sufficient lateral support and is not sufficiently large to insure positive sealing between the primary sealing surface and the wall with which it mates. In addition, the component of force produced by the fluid pressure normal to the sealing surface is quite small because of the obliqueness of the portion of the seal exposed to fluid pressure. Furthermore, the Takigawa structure is not bidirectional and it is most desirable to have a seal which may function to seal off fluid pressure from either direction because installers of valves often do not know the direction of fluid flow.

Accordingly, it is an object of the present invention to provide a novel bidirectional fluid control valve which utilizes pressure to increase the seal established between the closure member and the flow passage responsive to pressurized flow in either direction.

Other objects and advantages of the present invention will become apparent from the following portion of this specification and from the accompanying drawings which illustrate in accordance with the mandate of the patent statutes presently preferred embodiments incorporating the principles of the invention.

Referring to the drawings:

FIG. 1 is an elevational view of a closed butterfly valve made in accordance with the teachings of the present invention;

FIG. 2 is a sectional view taken along the line 2—2 of FIG. 1;

FIG. 3 is a perspective enlarged view partially in section of the seal illustrated in FIG. 2;

FIG. 4 is an enlarged cross-sectional view of a portion of the valve illustrated in FIG. 2 in a neutral (zero fluid pressure) condition;

FIG. 5 is a sectional view similar to that of FIG. 4 showing another embodiment of the invention;

FIG. 6 is an enlarged view illustrating a portion of the valve shown in FIG. 4;

FIG. 7 is a view similar to that of FIG. 6, illustrating the deflection of the valve seat in a prior art valve seat channel, and FIG. 8 is a view similar to that of FIG. 7, illustrating the valve seat at a high pressure condition.

Referring to FIGS. 1 and 2, a valve is illustrated which includes a valve body or housing 10 having a generally cylindrical flow passage 12. Disposed at right angles to the flow passage 12 is a generally cylindrical bore 14 which extends completely through the housing and which receives a bushing 48. The housing includes a generally planar annular seal retention surface 16 and a continuous generally planar annular retainer mounting surface 18. Four holes 20 are provided in the housing to accommodate bolts in a customary manner to secure the valve to pipe flanges (not shown) which mate with the housing flanges 22, 24. The uppermost portion of the housing includes a generally planar plate mounting surface 26.

Carried within the housing is a shaft and butterfly assembly 28. The butterfly 30 conventionally is generally cylindrical and is provided with one planar face 32 and one oppositely disposed concave face including a central circular portion 36 and concentric annular beveled portion 38 which extends to a ridge 40. The axial thickness of the butterfly is greatest at this ridge 40 with the outer surface thereof 42 which, in the preferred form, is a section of a sphere extending radially outwardly from the ridge 40 to the periphery of the butterfly 44. The butterfly 30 is fixedly mounted on a shaft 46 which is rotatably mounted in the bushing 48.

Positioned in abutting relationship to the annular butterfly valve surface 42 when the butterfly 30 is in the closed position is a seal generally designated by the numeral 50. An annular sealing surface 52 bears against the annular butterfly valve surface 42 to provide the desired seal around the periphery of the butterfly 40. In its preferred form, the seal 50 includes an upper portion 54 and a base portion 55. The upper portion 54 is provided with one annular groove 56 in each face thereof. Annular notches 57 are defined on the opposing edges of the upper portion 54, but the axial dimension or width of the notches 57 are less than the axial dimension or width of the grooves 56 so that a net force will be produced by the controlled fluid when the valve is dead to assist sealing at the surface 52. A notch or groove 59 is provided in the base portion to accommodate an 0-ring 61 best shown in FIG. 4. The valve seat material which has been found most satisfactory is fiber glass reinforced polytetrafluoroethylene fibers. Typically, the size of the annular grooves with this material and the usual application for such valves require a groove having a radius of approximately 0.020 of an inch, an included angle of approximately fifteen degrees and extending at least half the axial width of the face portion 54. The grooves 57 typically will have a radial dimension of approximately 0.025 of an inch and an axial width of approximately 0.050 of an inch. Referring particularly to FIGS. 3 and 4, a clearance is provided between the upper portion 54 of the seal and the walls of the seal receiving channel so that fluid communication will exist between a groove 56 and the flow passage 12 when the butterfly assembly 28 is in the closed position as shown in FIG. 2, regardless of flow direction. The contour of the valve body 10 includes an oblique surface of the housing identified by the numeral 63 in FIG. 4 which allows the seal 50 to move generally axially (1), when the butterfly 30 is rotated or (2), when pressure on the left side of butterfly shaft assembly 28 causes deflection of the shaft 46 toward the right (the normal downstream) side and thereby displacement of the seal 50 to the right as viewed. The axial movement of the seal 50 will correspond to the deflection of the shaft 46 and the deformation of the butterfly to insure cooperation between the normal cooperating surfaces of the butterfly 30 and seal 50.

The base 55 portion is generally trapezoidal in contour and preferably flares outwardly to mate with the housing 10 seal receiving channel in order to positively mount the seal.

The seal 50 is secured by an annular retainer member 64 having a generally planar surface 66 which engages with the seal 50 and which holds the seal in compression against the generally planar seal retention surface 16. The compressive engagement of the seal 50 prevents leakage around the seal. The 0-ring 61 is a redundant seal which is provided to prevent leakage around the seal 50 in the event there is cold flow of the seal 50 material. A generally planar surface 68 on retainer member 64 is provided for engagement with generally planar retainer mounting surface 18. The generally planar seal retention surface 16 and the generally planar surface 68 are proximate obliquely disposed surface 63. The retainer member 64 is secured to the housing 10 by four socket bolts 74 in the illustrated embodiment.

Attached to the shaft 46 by means of a pin 78 is a handle 76 which enables the butterfly to be displaced to either the flow obstructing or non-obstructing position. Bolts 79 and washers 80 secure a generally planar plate 82 to the generally planar plate mounting surface 26. This plate is provided as part of a detent structure intended to hold the handle 76 in a preselected position. Additional portions of the detent mechanism have been omitted for simplicity. Similarly, shaft seals are provided around the shaft 46 although these have been omitted in the drawing for simplicity.

In operation, fluid pressure will enter the annular grooves 56 on either face depending upon the location of the source of fluid pressure. The fluid pressure in the annular groove which receives the pressurized fluid will tend to cause a radial displacement of the sealing surface 52 toward the mating surface 42.

The disclosed invention can be readily understood with reference to FIGS. 6, 7 and 8 of the drawings. FIG. 6, illustrates the seal 50 in the neutral position with the valve closed and low pressure present in the flow conduit and acting on the left-hand face of the butterfly.

Applicant has discovered that when the pressure within the flow conduit is increased to a very substantial level, the butterfly, which is pivotally joined to the housing via a shaft 46 (FIG. 2), tends to axially deflect. Since axial displacement is restricted proximate the locations where the shaft enters the housing (for example, at 6–12 o'clock), the butterfly becomes warped or deformed with the greatest degree of deformation occurring at 3 and 9 o'clock. The warping of the butterfly at is illustrated in FIG. 7. As can be seen from this Figure, as this deformation occurs, the portion of the butterfly proximate the right-hand edge of the valve seat proceeds downwardly to compress the seat while the portion of the butterfly proximate the left-hand edge of the seat proceeds upwardly away from the seat.

While valve seats are resilient in character, the degree of resiliency is traditionally very limited, and as a result, the forceful compression of the seat along its right-hand side prevents the left-hand portion from following the butterfly. As a result, a cleavage occurs between the seat and the butterfly which permits the high pressure fluid to advance thereinto resulting in the at least partial failure of the seal.

Applicant has deduced that the seal attempts to automatically resolve the problem by pivoting to the right, but such displacement is restricted by the right-hand side wall (illustrated in broken lines in FIGS. 5, 6 and 7) of prior art seal grooves which extends parallel to the left-hand wall thereof.

In accordance with the present invention, Applicant establishes the right-hand side wall of the groove at a 6° angle (FIG. 4) relative to the left-hand side wall so that the fluid pressure acting on the left-hand face of the butterfly can pivotally displace the seal into engagement with the inclined right-hand wall. Such permits the reorientation of the top surface of the seat, whereby the seat properly follows the butterfly (FIG. 8) to maintain the seal.

What is claimed is:

1. A valve comprising
   a closure member including an annular peripheral substantially flat sealing surface,
   a supporting shaft fixedly secured to opposing sides of closure member,
   a housing including a cylindrical flow passage and means for rotatably supporting said closure member supporting shaft,
   means for rotating said closure member from a first position whereat said flow passage is open to a second position whereat said flow passage is closed,
   an annular substantially flat valve seat including an annular sealing surface,
   said housing further including an annular valve seat receiving channel selectively configured to support said annular valve seat for mating engagement with said closure member sealing surface when said closure member is at said closed position and the valve seat is at the neutral or low pressure position,
   said valve seat including a recessed portion on one side thereof with a first annular groove extending axially into said valve seat from said recessed portion, and
   a second annular groove extending axially into the other side of said valve seat, said second groove dividing said other valve seat into upper and lower portions, said first annular groove being located in said upper portion,
   the side of said receiving channel adjacent to the other side of said valve seat being spaced from the lower most part of said upper portion and being selectively inclined relative thereto when the valve seat is in the neutral position, to establish a spacing therebetween which linearly increases towards the uppermost part of said upper portion to permit selected rotation of said valve seat, the annular closure member sealing surface extending incrementally radially outwardly from the one side to the other side of the valve seat.

2. A valve according to claim 1, wherein said rotating means comprises means for rotating said supporting shaft.

3. A valve according to claim 1, wherein said valve seat further includes annular notches defined in the corners of said valve seat on either side of said valve seat sealing surface.

4. A valve according to claim 3, wherein the width of said valve seat receiving channel and said valve seat incrementally increases approaching the bottom thereof.

* * * * *